United States Patent [19]

Kitagawa et al.

[11] Patent Number: 5,354,534

[45] Date of Patent: Oct. 11, 1994

[54] METHOD FOR MANUFACTURING SINTERED PARTS

[75] Inventors: Nobuyuki Kitagawa; Toshio Nomura, both of Itami; Katuyosi Saito, Kyoto, all of Japan

[73] Assignee: Sumitomo Electric Industries, Ltd., Osaka, Japan

[21] Appl. No.: 946,858

[22] Filed: Sep. 18, 1992

[51] Int. Cl.$^5$ ............................................. B22F 3/00
[52] U.S. Cl. ............................................. 419/10; 419/13; 419/14; 419/15; 419/18; 419/23; 419/38; 419/66
[58] Field of Search ............... 419/10, 13, 14, 15, 16, 17, 18, 38, 42, 43, 47, 61, 66, 68, 69, 23; 264/63, 344

[56] References Cited

U.S. PATENT DOCUMENTS

| | | | |
|---|---|---|---|
| 4,104,062 | 8/1978 | Weaver | 75/238 |
| 4,283,360 | 8/1981 | Henmi et al. | 264/63 |
| 5,059,388 | 10/1991 | Kihara et al. | 419/37 |
| 5,188,793 | 2/1993 | Nishio | 264/344 |
| 5,194,203 | 3/1993 | Kankawa et al. | 264/63 |

FOREIGN PATENT DOCUMENTS

501602 9/1992 European Pat. Off. .............. 264/63

OTHER PUBLICATIONS

Perry, Robert H. et al, *Chemical Engineer's Handbook*, 1973, Periodic Table of the Elements.

*Primary Examiner*—Donald P. Walsh
*Assistant Examiner*—Chrisman D. Carroll
*Attorney, Agent, or Firm*—Wenderoth, Lind & Ponack

[57] ABSTRACT

The invention provides a method for manufacturing sintered parts, which uses as a debinder solvent a substance harmless to the human body and which can enhance the strength of an injection-molded product. Sintered parts suitable for use in industrial production processes and, moreover, extremely high in strength of injection-molded parts, can be produced by the steps of: mixing at least one of a sintering inorganic powders of a metal powder, a metal carbide, a carbon-nitride, a nitride powder and a ceramic powder, with an organic binder composed of an organic substance soluble in an alcohol series solvent and an organic substance insoluble in the same; injection-molding the composition obtained by the preceding process into a metal mold of a sintered part shape; immersing the injection-molded product obtained by the preceding step into an alcohol series solvent to elute and remove part of the organic binder; and heating the product to remove the residual organic binder and sintering the same, wherein the portion soluble in the alcohol series solvent of the organic binder accounts for 30 to 70% of the binder.

3 Claims, No Drawings

METHOD FOR MANUFACTURING SINTERED PARTS

BACKGROUND OF THE INVENTION

1. Field of the Invention

The present invention relates to a method for manufacturing sintered parts by the powder metallurgy method.

2. Description of the Prior Art

Conventionally, it has been difficult to mold sintering materials obtained by the powder compression molding technique into articles having complicated shapes (i.e. complicated articles).

Recently, powder injection molding techniques capable of molding complicated articles which cannot be obtained by the conventional compression molding has aggressively been developed (for example, disclosed in the Japanese Patent Application No. SHO 62-33282). Such a powder injection molding method includes the steps of adding an organic binder to an inorganic material to provide flowability thereto and removing the organic binder from the material by a debinder process prior to sintering.

However, the method, having a great difficulty in removing the organic binder, takes much time to prevent any defects from occurring to the products, or causes the products to be limited to small-sized ones. This problem becomes more significant especially as the powder becomes finer.

Therefore, as another example, it has been proposed that part of the binder is eluted in a solvent (disclosed in U.S. Pat. No. 4,765,950). The elution method using a solvent facilitates the removal of the organic binder.

In the method according to the U.S. Pat. No. 4,765,950, however, the solvent to be used is in the chlorine or ketone series, which is hard to industrially use because of the influence on the human body. Also, the binder soluble in the solvent is of liquid phase at room temperature, which causes a problem that an injection molded product is extremely low in strength.

SUMMARY OF THE INVENTION

The present invention has been accomplished in order to solve the above-mentioned problems of the prior art. Accordingly, an object of the invention is to provide a method for manufacturing sintered parts, which uses a substance harmless to the human body as the binder elution solvent and moreover which can increase the strength of injection-molded products.

The method for manufacturing sintered parts according to the present invention includes the steps of: mixing at least one kind of sintering inorganic powder selected from a metal powder, a metal carbide, a carbon-nitride, a nitride powder and a ceramic powder with an organic binder composed of an organic substance soluble in an alcohol series solvent and organic substances insoluble in the same; injection-molding the composition obtained by the preceding step into a metal mold of sintered part shape; immersing the injection-molded product obtained by the preceding step in the alcohol series solvent so as to elute and remove part of the organic binder; and thereafter removing by heating the residual organic binder and sintering the molded product, the method being characterized in that the portion soluble in the alcohol series solvent of the organic binder accounts for 30 to 70% of the binder.

It is preferable that the portion soluble in the alcohol series solvent of the organic binder contains polyethylene glycol.

It is preferable that the sintering inorganic powder is composed of at least one kind of component selected from a metal of IVb group, Vb group and VIb group metals in the periodic table, a carbide, a carbon-nitride and a nitride, and a ferrous metal and carbon.

Furthermore, the sintering inorganic powder is of a mean particle diameter of 10 $\mu$m or less and that containing 20% or more of a fine powder having a mean diameter of 1 $\mu$m or less is remarkably effective.

The inventors of the present invention focused on the alcohol series as a solvent harmless to the human body and researched the elution debinder method of various organic substances, finding that, among the alcohol series, methyl alcohol and ethyl alcohol are especially effective in binder elution. From further research, it was found that 30 to 70% of the organic binder is made soluble in the alcohol series solvent. The reason for this is that less than 30% of the soluble component would likely cause a defect to occur to the molded product in the subsequent heating process, and that more than 70% of the soluble component would cause the injection molded product to be insufficient in strength.

Also, it is extremely effective to use polyethylene glycol as a soluble binder component. In particular, since polyethylene glycol having a molecular weight of about 800 or more is solid at room temperature, the injection-molded product is high in strength and good in elution efficiency. In order to further improve the elution efficiency, the alcohol series solvent should be heated to 45° to 60°. The method of the present invention in this case is more effective with fine powders.

In addition, the sintering inorganic powder is composed of at least one kinds of component selected from a metal of IVb group, Vb group and VIb group in the periodic table, a carbide, a carbon-nitride and a nitride, and a ferrous metal and carbon. The present invention uses a sintering powder having a mean particle diameter of 10 $\mu$m or less and including 20% or more of a fine powder having a mean particle diameter of 1 $\mu$m or less. Thus, by arranging the fine powder to be 20% or more, the debinder process can be facilitated better than was conventionally possible, saving the time required for the debinder process.

DETAILED DESCRIPTION OF THE PREFERRED EMBODIMENTS

First, 88% of commercially available WC powder having a mean particle size of 5 $\mu$m and 12% of Co powder having a mean particle size of 2 $\mu$m were mixed and crushed with a wet ball mill for 30 hours and thereafter dried. Examining the size distribution after crushing, it was found that the fine powder having a mean diameter of 1 $\mu$m or less was contained to 23%. The inorganic powder obtained being assumed to be 100%, an organic binder as shown in Table 1 was added thereto by 75%. As seen Table 1, the organic binder comprises organic substances (polyethylene glycol of 1000 in molecular weight and stearic acid) soluble in an alcohol series solvent and organic substances (polyethylene, polypropylene and paraffin) insoluble in the same, the organic substances soluble in the alcohol series solvent accounting for 50% of the organic binder.

TABLE 1

| Polyethylene Glycol | 4.5% | Soluble in alcohol |

TABLE 1-continued

| | | |
|---|---|---|
| (Molecular Weight: 1000) | | series solvent |
| Stearic Acid | 0.5% | soluble in the same |
| Polyethylene | 1.0% | Insoluble in the same |
| Polypropylene | 1.0% | Insoluble in the same |
| Paraffin | 0.5% | Insoluble in the same |

Next, the inorganic powder and the organic binder were kneaded for two hours and then injection-molded into a metal mold (not shown) by an injection molding machine and the molded product was immersed in an alcohol series solvent. Thereafter, it was heated up to 500° C. at a rate of 100° C./hr and then heated up to 1400° C. in a vacuum at 20° C./hr and sintered for 30 minutes, thereby obtaining a product. Table 2 lists the conditions of solvent temperature and immersion time, an elution amount of binder, and whether any defect was found or not in the sintered product (crack on a sample) in the case where methyl alcohol was used as a solvent for the debinder process.

TABLE 2

| Solvent | Solvent temp. (°C.) | Immersion time (hrs.) | Elution/total binder amount (%) | Crack on Sample |
|---|---|---|---|---|
| Methyl-alcohol | 20 | 7 | 26.2 | Found |
| | | 16 | 32.3 | Swollen |
| | 40 | 1 | 14.6 | Found |
| | | 2 | 20.4 | Found |
| | | 4 | 26.9 | Found |
| | | 6 | 33.2 | None |
| | 50 | 1 | 21.7 | Found |
| | | 2 | 32.1 | Found |
| | | 3 | 39.9 | None |
| | | 4 | 45.6 | None |
| | | 5 | 45.6 | None |

As seen from Table 2, after immersion in methyl alcohol at 40° C. for 6 hours or at 50° C. for 3 to 5 hours, non-defective samples were obtained in each case, the strength of the injection-molded product being all sufficient for handling.

On the other hand, Table 3 lists the conditions of solvent temperature and immersion time, an elution amount of binder, and whether any defect was found or not in the sintered product (crack on a sample) in the case where ethyl alcohol was used as a solvent for the debinder process.

TABLE 3

| Solvent | Solvent temp. (°C.) | Immersion time (hrs.) | Elution/total binder amount (%) | Crack on Sample |
|---|---|---|---|---|
| Ethyl-alcohol | 50 | 1 | 18.4 | Found |
| | | 2 | 22.5 | Found |
| | | 4 | 39.8 | None |
| | | 6 | 42.6 | None |
| | | 8 | 45.4 | None |

As seen from Table 3, after immersion in ethyl alcohol at 50° C. for 4 to 8 hours at 50° C., non-defective samples were obtained, the strength of injection-molded product being sufficient for handling.

In the above embodiment, polyethylene glycol was used as the binder component, but other organic substances soluble in an alcohol series solvent and solid at room temperature may alternatively be used without being limited to the above.

As described hereinabove, an alcohol series solvent is used as a solvent capable of eluting the binder and therefore, unlike the conventional chlorine or ketone series solvent, the resulting method can be harmless to the human body and suitable for use in industrial production processes. Furthermore, the portion soluble in an alcohol series solvent of the organic binder accounts for 30 to 70% thereof, unlike any conventional liquid binder used at room temperature, the manufacturing method of the invention is advantageous in that the injection molded product is high in strength and superior in elution efficiency.

Although the present invention has been fully described by way of examples it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A method for manufacturing sintered parts which includes the steps of:

injection molding into a metal mold, of a sintered part configuration, a composition obtained by mixing one or more kinds of sinterable inorganic powers having an average particle diameter of 10 μm or less and including 20% or more of a fine powder having an average particle diameter of 1 μm or less and comprising powders selected from a carbide, a carbon-nitride and a nitride of a metal of IVb group, Vb group and VIb group metals in the Periodic Table, including WC, with an organic binder composed of an organic substance soluble in an alcohol series solvent and an organic substance insoluble in an alcohol series solvent;

immersing the composition into an alcohol series solvent to elute and remove part of the organic binder from the component; and thereafter heating the composition to remove the residual organic binder and sintering the composition, characterized in that a portion of the organic binder soluble in an alcohol series solvent accounts for 30 to 70% of the organic binder and wherein polyethylene glycol having a molecular weight of 800 or more accounts for at least 50% of said portion of the organic binder soluble in an alcohol series solvent, and wherein the alcohol series solvent employed for immersing the composition is heated to temperatures of 45° C. up to 60° C.

2. A method according to claim 1 wherein the sinterable inorganic powder is composed of WC powder and Co powder.

3. A method according to claim 1 wherein the polyethylene glycol has a molecular weight ranging from 800 to 1000.

* * * * *